United States Patent
Varma et al.

(10) Patent No.: US 7,472,225 B2
(45) Date of Patent: Dec. 30, 2008

(54) CACHING DATA

(75) Inventors: Rahoul Kumar Varma, Berkshire (GB); David Francis McHale, Harrow (GB); Philippe Jean-Pierre Raphalen, Valbonne (FR); Christophe Justin Evrard, Le Tignet (FR); Cedric Denis Robert Airaud, Saint Laurent du Var (FR)

(73) Assignee: ARM Limited, Cambridge (GB)

( * ) Notice: Subject to any disclaimer, the term of this patent is extended or adjusted under 35 U.S.C. 154(b) by 216 days.

(21) Appl. No.: 11/155,871

(22) Filed: Jun. 20, 2005

(65) Prior Publication Data

US 2006/0288170 A1 Dec. 21, 2006

(51) Int. Cl.
*G06F 12/02* (2006.01)
(52) U.S. Cl. .................................... 711/122
(58) Field of Classification Search ............... 711/122, 711/133, 134
See application file for complete search history.

(56) References Cited

U.S. PATENT DOCUMENTS

| | | | |
|---|---|---|---|
| 6,253,286 B1 * | 6/2001 | Arimilli et al. | 711/122 |
| 6,349,365 B1 * | 2/2002 | McBride | 711/133 |
| 6,356,980 B1 * | 3/2002 | Arimilli et al. | 711/138 |
| 6,381,679 B1 * | 4/2002 | Matsubara et al. | 711/137 |
| 7,099,998 B1 * | 8/2006 | Berkovits | 711/134 |
| 2006/0206874 A1 * | 9/2006 | Klein | 711/136 |

* cited by examiner

*Primary Examiner*—Kevin L Ellis
(74) *Attorney, Agent, or Firm*—Nixon & Vanderhye P.C.

(57) ABSTRACT

A data processing apparatus and a method for caching data values in data processing apparatus comprising a level one cache and a level two cache is disclosed. Both the level one cache and the level two cache are operable to store the data values. The method comprises the steps of: a) receiving a transaction request in which a data transaction relating to a data value is requested to occur, the transaction request including cache policy attributes associated with an address of the data value; and b) determining from the cache policy attributes whether or not the data value can be stored by the level one cache and the level two cache and, if so, in which one of the level one cache and the level two cache the data value is to be stored in order to ensure that the data value is prevented from being stored in both the level one cache and the level two cache. Providing cache policy attributes with each data transaction enables a simple determination to be made of which cache should be used to store each data value, with other caches being prevented from storing that data value. Such an approach obviates the need to perform any complex operations in order to determine which cache should be used to store that data value. Hence, a data value may be prevented from being stored in both the level one cache and the level two cache at any one time which ensures that the level one cache and level two cache do not store duplicate data thereby increasing the likelihood of a cache hit within level one or level two for any data value.

23 Claims, 3 Drawing Sheets

| INNER/OUTER | | | | description | |
|---|---|---|---|---|---|
| WA | RA | C | B | | |
| 0 | 0 | 0 | 0 | Non cacheable, non bufferable | (NC) |
| 0 | 0 | 0 | 1 | Bufferable only | (NC) |
| 0 | 0 | 1 | 0 | Cacheable but do not allocate | (NC) |
| 0 | 0 | 1 | 1 | Cacheable and bufferable, do not allocate | (NC) |
| 0 | 1 | 1 | 0 | Cacheable write through, allocate on read | (WTRA) |
| 0 | 1 | 1 | 1 | Cacheable write back, allocate on read | (WBRA) |
| 1 | 0 | 1 | 0 | Cacheable write through, allocate on write | (WTWA) |
| 1 | 0 | 1 | 1 | Cacheable write back, allocate on write | (WBWA) |
| 1 | 1 | 1 | 0 | Cacheable write through, allocate on both read and write | (WTRAWA) |
| 1 | 1 | 1 | 1 | Cacheable write back, allocate on both read and write | (WBRAWA) |

FIG. 3

| Inner cache attributes | Outer cache attributes | L2 Write miss + Write backs x [0] set | Read hit | Read miss |
|---|---|---|---|---|
| WBRA | WTRA | allocate + L3(Wr) | clean + invalidate | no allocation |
| WBRA | WBRA | allocate | clean + invalidate | no allocation |
| WBRA | WTWA | allocate + L3(Wr) | clean + invalidate | no allocation |
| WBRA | WBWA | allocate | clean + invalidate | no allocation |
| WBRA | WTRAWA | allocate + L3(Wr) | clean + invalidate | no allocation |
| WBRA | WBRAWA | allocate | clean + invalidate | no allocation |
| WBRAWA | WTRA | allocate + L3(Wr) | clean + invalidate | no allocation |
| WBRAWA | WBRA | allocate | clean + invalidate | no allocation |
| WBRAWA | WTWA | allocate + L3(Wr) | clean + invalidate | no allocation |
| WBRAWA | WBWA | allocate | clean + invalidate | no allocation |
| WBRAWA | WTRAWA | allocate + L3(Wr) | clean + invalidate | no allocation |
| WBRAWA | WBRAWA | allocate | clean + invalidate | no allocation |

WTRA = Writethrough with read allocate set.
WTWA = Writethrough with write allocate set.
WTRAWA = Writethrough with read and write allocate set.
WBRA = Writeback with read allocate set.
WBWA = Writeback with write allocate set.
WBRAWA = Writeback with read and write allocate set.

FIG. 4

CACHING DATA

FIELD OF THE INVENTION

The present invention relates to the caching data. Example embodiments of the present invention relate to techniques for caching data values in a data processing apparatus having a level one cache and a level two cache.

BACKGROUND

In a data processing apparatus, it is often the case that multiple caches are provided. In one such data processing apparatus arrangement there may be, provided a level one cache and a level two cache, both of which may be provided on-chip together with a processor core. A level three memory, which is typically provided off-chip, is a main repository for data values.

Data values required by the processor core are typically stored in the level one cache. The level one cache is rapidly accessible by the processor core. However, in order to maintain rapid access times to the level one cache, its size is typically small. Hence, it is known to provide a level two cache in which data values may be stored on-chip so that they may be accessed should they be required by the processor core without having to perform a slower data access to the level three memory.

Such an arrangement provides for improved performance by enabling the most frequently used data values to be accessible readily by the level one core. But, a problem with such an arrangement is that controlling where to store data values is complicated when more than one cache is provided. Accordingly, it is desired to provide a improved technique for caching data values when more than one cache is provided.

SUMMARY

According to a first aspect there is provided a method of caching data values in a data processing apparatus, the data processing apparatus comprising a level one cache and a level two cache, both the level one cache and the level two cache being operable to store the data values, the method comprising the steps of: a) receiving a transaction request in which a data transaction relating to a data value is requested to occur, the transaction request including cache policy attributes associated with an address of the data value; and b) determining from the cache policy attributes whether or not the data value can be stored by the level one cache and the level two cache and, if so, in which one of the level one cache and the level two cache the data value is to be stored in order to ensure that the data value is prevented from being stored in both the level one cache and the level two cache.

Providing cache policy attributes with each data transaction enables a simple determination to be made of which cache should be used to store each data value, with other caches being prevented from storing that data value. Such an approach obviates the need to perform any complex operations in order to determine which cache should be used to store that data value. It will be appreciated if the same data values were stored in the level one cache and the level two cache, the available space for storing other data values is reduced. Hence, a data value may be prevented from being stored in both the level one cache and the level two cache at the same time. Preventing a data value from being stored in both the level one cache and the level two cache at the same time ensures that the level one cache and level two cache do not store duplicate data. Hence, a simple technique is provided which also frees up space in the level one cache and level two cache for further data values and so increases the likelihood of a cache hit occurring.

In non-limiting example embodiments, the transaction request is a request to allocate the data value to the level one cache and the step (b) comprises: determining whether the cache policy attributes indicate that the data value is writeback cacheable to the level one cache and, if so, the method further comprises the step of requesting the data value from the level two cache and, if the request results in a level two cache hit, storing the data value to the level one cache and invalidating the data value stored in the level two cache.

Hence, in the event the data value is indicated by the cache policy attributes associated with the data transaction as being cacheable in the level one cache, the level two cache is accessed and, if the data value is stored in the level two cache, it is copied to the level one cache and the data value in the level two cache is marked as invalid so that the duplicate entry in the level two cache may be freed to enable other data values to be stored in that entry when required.

In non-limiting example embodiments, the transaction request is a request to allocate the data value to the level one cache and the step (b) comprises: determining whether the cache policy attributes indicate that the data value is writeaback cacheable to the level one cache and, if so, the method further comprises the step of requesting the data value from the level two cache and, if the request results in a cache miss, accessing the data value from a level three memory and storing the data value to the level one cache.

Hence, in the event the data value is indicated by the cache policy attributes associated with the data transaction as being cacheable in the level one cache, the level two cache is accessed and, if the data value is not stored in the level two cache, it is retrieved from the level three memory and stored in the level one cache.

In non-limiting example embodiments, the transaction request is a request to allocate the data value to the level one cache, the cache policy attributes indicate that the data value is writeaback cacheable to the level one cache, the step of requesting the data value from the level two cache results in a cache miss and the step accessing the data value from a level three memory and storing the data value to the level one cache comprises accessing the data value from the level three memory and storing the data value to the level one cache without storing the data value in the level two cache irrespective of whether the cache policy attributes indicate that the data value may be stored in the level two cache.

Hence, in the event the data value is indicated by the cache policy attributes associated with the data transaction as being cacheable in the level one cache, the level two cache is accessed and, if the data value is not stored in the level two cache, it is retrieved from the level three memory and stored directly in the level one cache without a duplicate entry being stored in the level two cache, even if the cache attributes indicate that an entry should be made.

In non-limiting example embodiments, the transaction request is a request to evict the data value from the level one cache and the step (b) comprises: determining whether the cache policy attributes indicate that the data value is cacheable to the level two cache and, if so, the method further comprises the step of evicting the data value stored in the level one cache and storing the evicted data value to the level two cache.

Hence, in the event the data value is indicated by the cache policy attributes associated with the data transaction as being cacheable in the level two cache, the data value is written to the level two cache and the duplicate entry in the level one cache may be overwritten to enable other data values to be stored in that entry.

In non-limiting examples embodiments, the transaction request is a request to evict the data value from the level one cache, the cache policy attributes indicate that the data value is writeaback cacheable to the level two cache, the method further comprises the step of evicting the data value stored in the level one cache, storing the evicted data value to the level two cache, and toting the evicted data value in the level three memory.

Hence, in the event the data value is indicated by the cache policy attributes associated with the data transaction as being writethrough cacheable in the level two cache, the data value is written to the level two cache and the level three memory using the data value evicted from the level one cache.

In non-limiting example embodiments, the transaction request is a request to evict the data value from the level one cache, the cache policy attributes indicate that the data value is writeback cacheable to the level two cache, the method further comprises the step of evicting the data value stored in the level one cache, storing the evicted data value to the level two cache, and marking the evicted data value in the level two cache as being dirty unless the cache policy attributes indicate the evicted data value as being clean.

Hence, in the event the data value is indicated by the cache policy attributes associated with the data transaction as being writeback cacheable in the level two cache, the data value is written to the level two cache and the level three memory using the data value evicted from the level one cache. Also, the data value in the level two cache is marked as dirty, as required.

In non-limiting example embodiments, the transaction request is a request to evict the data value from the level one cache and the step (b) comprises: determining whether the cache policy attributes indicate that the data value is cacheable to the level two cache and, if not, the method further comprises the step of evicting the data value stored in the level one cache and storing the evicted data value to the level three memory.

In non-limiting example embodiments, the cache policy attributes comprise an inner attribute indicative of a cache policy adopted by the level one cache for the address value and an outer attribute indicative of the cache policy adopted by the level two cache for the address value.

In non-limiting example embodiments, the cache policy attributes are provided for transactions relating to data values other than those representing instructions.

In non-limiting example embodiments, the method further comprises the step of providing page tables associating each data value with predetermined cache policy attributes.

According to a second aspect there is provided a data processing apparatus operable to cache data values, the data processing apparatus comprising a level one cache and a level two cache, both the level one cache and the level two cache being operable to store the data values, the data processing apparatus comprising: reception logic operable to receive a transaction request requesting a data transaction of a data value occur, the transaction request including cache policy attributes associated with an address of the data value; and determining logic operable to determine from the cache policy attributes whether or not the data value can be stored by the level one cache and the level two cache and, if so, the determining logic being further operable to determine in which one of the level one cache and the level two cache the data value is to be stored in order to ensure that the data value is prevented from being stored in both the level one cache and the level two cache.

According to a third aspect there is provided a data processing apparatus for caching data values, the data processing apparatus comprising a level one cache and a level two cache, the level one cache and the level two cache both for storing the data values, the data processing apparatus comprising: reception means for receiving a transaction request requesting a data transaction of a data value occur, the transaction request including cache policy attributes associated with an address of the data value; and determining means for determining from the cache policy attributes whether or not the data value can be stored by the level one cache and the level two cache and, if so, for determining in which one of the level one cache and the level two cache the data value is to be stored in order to ensure that the data value is prevented from being stored in both the level one cache and the level two cache.

BRIEF DESCRIPTION OF THE DRAWINGS

FIG. 3 is a table illustrating the components of the cache policy attributes;
FIG. 4 is a table illustrating the cache policy adopted dependent on the type of data transaction being performed and the cache policy attributes associated with that data transaction.

DESCRIPTION

Figure 1:
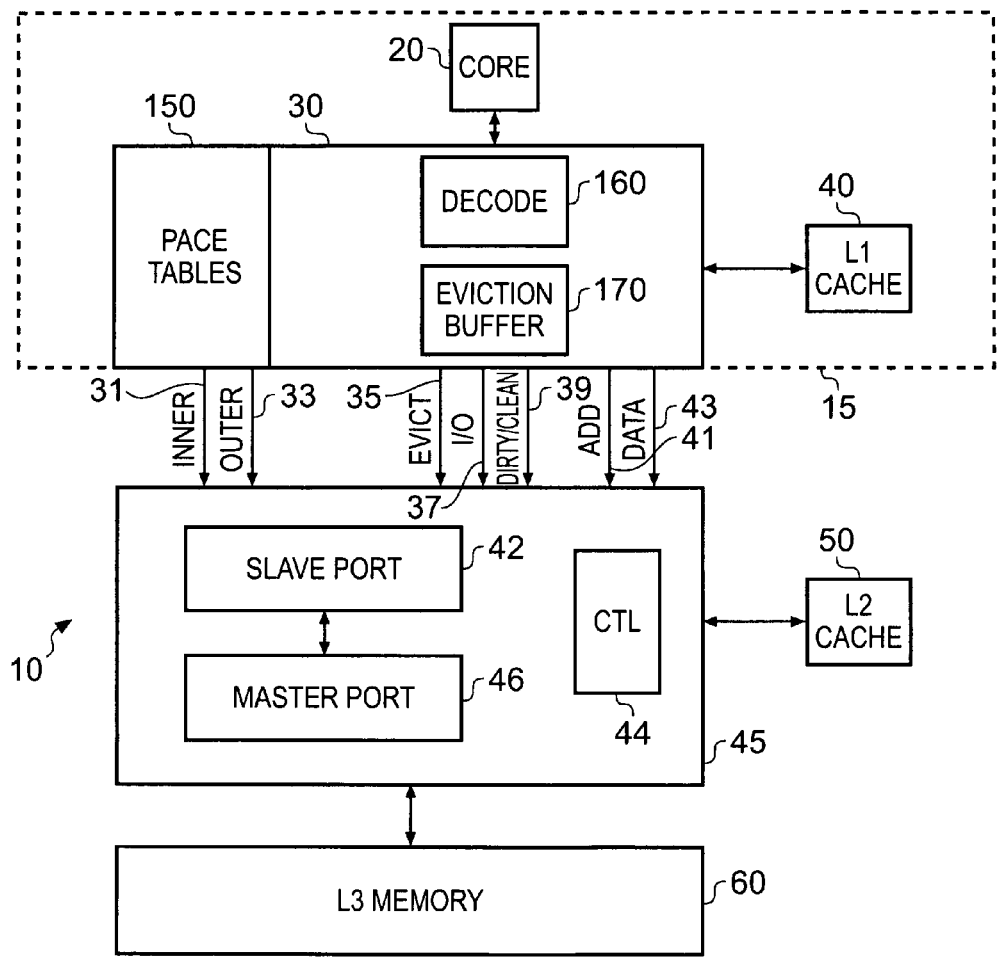
FIG. 1 illustrates a data processing apparatus.

FIG. 1 illustrates a data processing apparatus, generally 10. The data processing apparatus 10, comprises level one processor 15 having a processor core, 20 coupled with a level one cache controller 30, which is coupled with a level one cache 40. Coupled with the level one processor 15 is a level two cache controller 45, which is in turn coupled with a level two cache 50. Coupled with the level two cache controller 45 is a level three memory 60. The level three memory 60 is a main repository for data values (which involves both data and instructions) stored at addresses in the level three memory 60.

As will be appreciated by those skilled in the art, level one processor 15, in response to instructions being executed causes data values to be retrieved from the level three memory 60 to enable those data values to be processed. The data values are retrieved to one of the level one cache 40 and the level two cache 50, in accordance with a predetermined cache allocation policy. Hereafter, the term data value will be used to refer to both instructions and data. The cache allocation policy ensures that exclusive caching occurs, whereby the data values are only ever stored (also known as allocated) in either the level one cache 40 or the level two cache 50.

In typical operation, the data values are retrieved from the level three memory 60 and allocated to the level one cache 40 because the level one cache 40 is most readily accessible by level one processor 15 and hence, the required data values can be accessed quickly. However, to enable the level one cache 40 to be accessed as quickly as possible, its size is necessarily limited. Accordingly, a situation arises whereby the level one cache 40, may become full. In this situation, data values are then evicted to the level two cache 50 for storage (or allocation) therein. Allocating the data to the level two cache 50 instead of evicting the data back to the level three memory 60 enables the data values to be retrieved by the level one cache 40 more quickly, should they be required subsequently. In this way, it will be appreciated that the level one cache 40 can maintain all the speed benefits required of it, whilst a certain subset of data values can still be stored on-chip and accessed relatively quickly, when required. Hence, it will be appreciated that such an approach can improve the performance of the data processing apparatus 10 since data values associated with, for example, various sub-routines can be switched between the level one cache 40 and the level two cache 50 as required.

Hence, either the level one cache 40 or the level two cache 50 will store the data value associated with a memory address until it is overwritten by a data value for a new memory address required by the core 20. The data values are stored in the level one cache 40 or the level two cache 50 using either physical or virtual memory addresses. Depending on the cache policy adopted, should the data value in either cache have been altered then it is usual to ensure that the altered data value is rewritten to the level three memory 60, either at the time that the data value is altered (referred to as write-through) or when the data value in the cache is over written (referred to as write-back).

Before discussing the arrangement of the data processing apparatus illustrated in FIG. 1 in more detail, the arrangement of the level one cache 40 and the level two cache 50 will be described in more detail with reference to FIG. 2.

A number of different configurations have been developed for organising the contents of a cache. One such configuration is the so-called low associative cache. In an example 16 K byte low associative cache, such as the level one cache 40, there are provided four cache ways which each contain a number of cache lines. A data value (in the following example, a word) associated with a particular address can be allocated in a particular cache line of any of the four cache ways (i.e. each set has four cache lines). Each cache way stores 4 Kbytes (16 Kbyte cache/4 cache ways). If each cache line stores 8 32-byte words, then there are 32 bytes/cache line (8 words×4 bytes/word) and 128 cache lines in each cache way (4 Kbytes/cache way)/(32 bytes/cache line)). Hence, in this illustrative example, the total number of sets would be 128.

Figure 2:
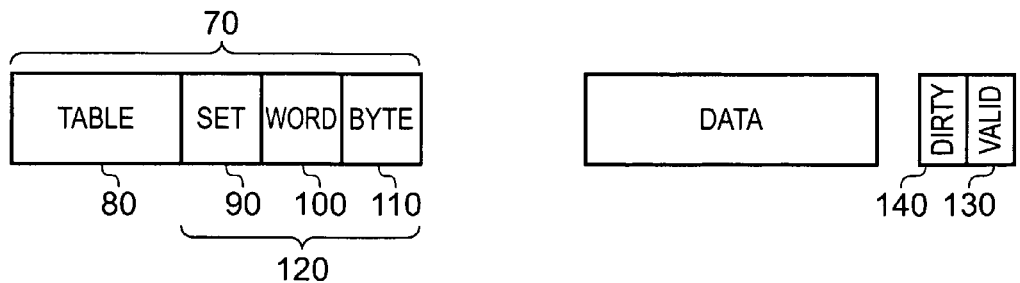
FIG. 2 illustrates the arrangement of an entry in the caches illustrated in FIG. 1.

The contents of a memory address associated with each data value is illustrated in FIG. 2. The memory address 70 consists of a TAG portion 80, and set, word, and byte portions 90, 100 and 110, respectively. The set portion 90 of the memory address 70 is used to identify a particular set within the level one cache 40. The word portion 100 identifies a particular word within the cache line, identified by the set portion 90 that is the subject of the access by the processor core 20, whilst the byte portion 110 allows a particular byte within the word to be specified, if required.

A word stored within the level one cache 40 may be read by specifying the memory address 70 of the word and by selecting the cache way which stores the word (the TAG portion 80 is used to determine in which cache way the word is stored). A logical address 120 (consisting of the set portion 90 and the word portion 100) then specifies a logical address of the word within that cache way. A word stored in the level one cache 40 may be overwritten to allow a new word for an address requested by the processor core 20 to be allocated. Typically, when allocating words in the level one cache 40, a so-called "line fill" technique is used whereby a complete cache line of, for example, eight words (32 bytes) will be fetched and stored.

In addition to the TAG stored in the TAG portion 80 of each cache line, a number of status bits are preferably provided for each cache line. Preferably the status bits are also provided within a TAG memory of the level one cache 40. Hence, associated with each cache line are a valid but 130 and a dirty bit 140.

As will be appreciated by those skilled in the art, the valid bit 130 is used to indicate whether a data value stored in the corresponding cache line is still considered valid or not. Hence, setting the valid bit 130 will indicate that the corresponding data values are valid, whilst clearing the valid bit 130 will indicate that at least one of the data values is no longer valid and, hence, can be freely overwritten.

Further, as will be appreciated by those skilled in the art, the dirty bit 140 is used to indicate whether any of the data values stored in the corresponding cache line are more up-to-date than the data value stored in the level three memory 60. The value of the dirty bit 140 is irrelevant for write-back regions of memory, where a data value provided by the processor core 20 and allocated to the level one cache 40 or the level two cache 50 is not immediately also passed to the level three memory 60 for storage, but rather the decision as to whether that data value should be passed to the level three memory 60 is taken at the time that the particular cache line is overwritten or "evicted", from the level one cache 40 or the level two cache 50. Accordingly, not setting the dirty bit 140 will indicate that the data values stored in the corresponding cache line also correspond to the data values stored in the level three memory 60, whilst setting the dirty bit 140 will indicate that at least one of the data values stored in the corresponding cache line has been updated, and the updated value has not yet been passed to the level three memory 60.

Returning now to FIG. 1, the level one processor 15 contains page tables 150, decode logic 160 and an eviction buffer 170.

The page tables 150 provide predetermined inner and outer cache policy attributes associated with addresses of data values. In this example, the cache policy attributes are associated with 4 Kbyte regions of memory. However, it will be appreciated that the cache policy attributes could be associated with smaller regions of memory, or even with individual cache lines or data values, if required. The inner and outer cache policy attributes will be discussed in more detail with reference to FIG. 3 below.

The decode logic 160 receives a data transaction request from the processor core 20 to access a data value in the level one cache 40. The decode logic 160 accesses the page tables 150 to determine the cache policy attributes associated with the address of the data value the subject of the data transaction request. The cache policy attributes provided by the page tables 150 determine whether and where the data value requested by the processor core 20 may be cached.

Within the level one processor 15 is an eviction buffer 170 which is used to store data values evicted from the level one cache 40 when space is needed to be made to make room for data values required by the level one processor core 20.

A bus is provided between the level one cache controller 30 and the level two cache controller 45 over which various signals (including the cache policy attributes) are provided relating to the data transaction being performed. These signals are received by a slave port 42 in the level two cache controller 45. The signals include an address provided over the path 41 indicative of a data value or a line of data values being transferred. Also provided are the cache policy attributes from the page tables, with an inner cache attribute being provided over the path 31 and an outer cache attribute being provided over the path 33. The combination of the inner and outer cache attributes provided over the path 31 and 33 dictate the cache policy associated with the associated address value provided over the path 41 which, as will be explained in more detail below, ensures that the data value is not stored in both the level one cache 40 and the level two cache 50 at the same time.

In addition to these signals a number of further signals are provided by the level one processor 15. An instruction/data signal is provided over the path 37 which indicates whether the data value associated with the address provided over the path 41 is either an instruction or data. In the event that the instruction/data signal provided over the path 37 indicates that the address value is associated with instructions then the outer caching policy is unaffected by the inner cache attribute.

Also, a clean/dirty signal is provided over the path 39 indicative of whether the data value is clean or dirty.

Furthermore, an eviction signal is provided over the path 35 indicative of whether the data value associated with the address provided over the path 41 is write-back or not.

These signals are provided to the controller logic 44 and are interpreted by the controller 44 in order to control the caching behaviour of the level two cache 50, as will be explained in more detail with reference to FIG. 4.

FIG. 3 illustrates in more detail the inner and outer cache attribute signals provided over the paths 31 and 33. Both the inner and outer attribute signals comprise 4 bits.

The 'B' bit indicates whether or not the associated address is bufferable or not If the data value is bufferable then the level two cache 40 can delay the operation (this is only relevant for write operations). In this case, a response is sent to the level one processor 15, and not from the final destination, such as the level three memory 60.

The 'C' bit indicates whether the data value is cacheable or not. Accordingly, the transaction at the final destination does not have to match the characteristics of the originating transaction. For write operations, this means that a number of different write transactions can be merged together. For read transactions, this means that a location can be pre-fetched or can be fetched just once for multiple read transactions.

The 'RA' bit indicates read allocate. This means that a read transfer, if it misses, should be allocated in the level two cache 40.

The 'WA' bit indicates write allocate. This means that a write transfer, if it misses, should be allocated in the level two cache 40.

It will be appreciated that by setting the bits as indicated in FIG. 3, a number of different cache allocation policies can readily be provided for each data transaction. As mentioned previously, these inner and outer cache attributes are determined by reference to the page tables 150 which contain predetermined policy attributes of data values stored at different addresses. These cache attributes are then used by the level one processor 15 and the cache controller 40 in order to determine where any particular data value should be stored for each data transaction.

FIG. 4 illustrates in more detail the caching policy adopted dependent on the type of transaction being performed and the cache policy attributes associated with that transaction.

In overview, data values are not permitted to reside in the level one cache 40 and the level two cache 50 at the same time.

When a data transaction occurs in which a data value is requested by the level one processor 15 to be written to the level one cache 40 and this results in a level two cache 50 hit, the data value is passed to the level one cache 40 and the cache line in the level two cache 50 is invalidated.

When a data transaction occurs in which a data value is requested by the level one processor 15 to be written to the level one cache 40 and this results in a level two cache 50 miss, the outer cache attributes are overridden, the data value retrieved from the level three memory 60 is not written to the level two cache 50 and instead is simply passed to the level one cache 40.

When data is to be evicted from the level one cache 40, the level two controller 45 will allocate this data to the level two cache 50 unless the outer cache attributes indicate the data value as being non-cacheable. The level one controller 30 will also indicate whether the data is clean, this is read by the level two controller 45 only when the eviction signal over the path 35 is set, otherwise, this value is ignored. Accordingly, if the outer cache attribute is set at write-through read allocate, data is allocated to the level two cache 50 and the level three memory 60 is also written to. If the outer cache attribute is set at write-back, data is allocated to the level two cache 50 and marked as dirty in level two cache 50 unless the clean/dirty signal provided over the path 39 is set as clean.

In this way, it can be seen that cache policy attributes can readily be provided with each data transaction, and the cache controllers 30 and 40 can readily determine from these cache policy attributes which of the level one cache 40 and the level two cache 50 should store that data value such that the data value is not duplicated in both caches.

Figure 5:
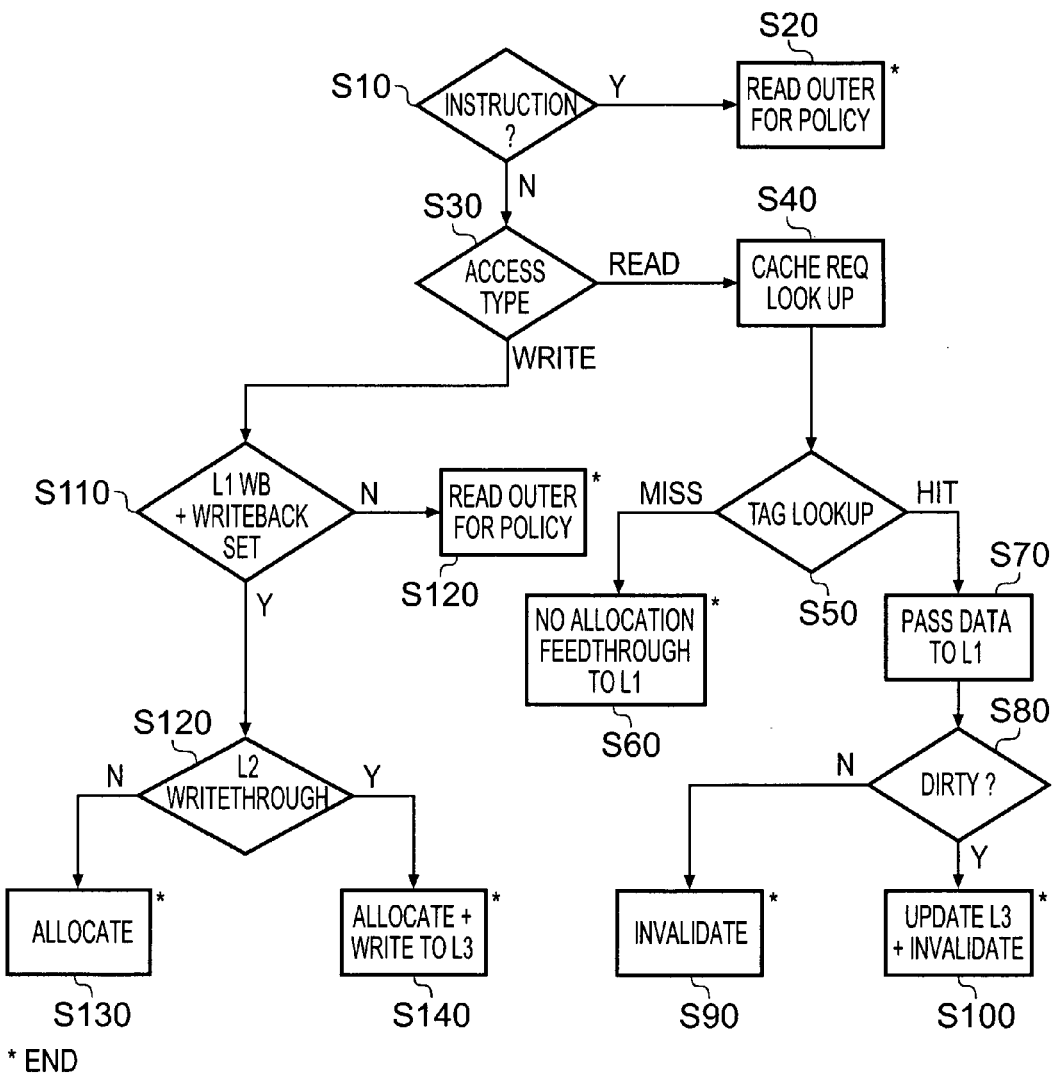
FIG. 5 is a flow chart illustrating the operation of the caching technique performed by the data processing apparatus of FIG. 1.

FIG. 5 is a flow-chart illustrating the operation of the exclusive caching technique performed by the data processing apparatus of FIG. 1.

At step s10, a determination is made as to whether the data transaction relates to an instruction or data. This determination is made with reference to the instruction/data signal provided over the path 37. In the event that the signal provided over the path 37 indicates that the data transaction relates to an instruction then processing proceeds to step s20 whereby the outer cache attribute is referred to in order to determine a caching policy for that instruction. In this example, exclusive caching is not used for instructions.

If it is determined at step s10 that the data transaction relates to data then processing proceeds to step s30.

At step s30, the type of access is determined. In the event that the access type is a read then processing proceeds to step s40.

At step s40, a level two cache 40 look-up occurs. Hence, at step s50, the TAG portion 80 of the address is provided to the level two cache 50. In the event that a cache miss occurs, processing proceeds to step s60.

At step s60, the data transaction is propagated to the level three memory 60 and when the data values are returned, these are not allocated to the level two cache 50 and are instead forwarded to the level one cache 40.

In the event of a cache hit occurring at step s50, processing proceeds to step s70.

At step s70, the data from the level two cache 50 is forwarded to the level one cache 40. Thereafter, at step s80, a determination is made of whether that data value is dirty or not. In the event that the data value is determined not to be dirty then, at step s90, the data value in the level two cache 50 is invalidated.

In the event that at step s80, it is determined that the data value in the level two cache 50 is dirty then processing proceeds to step s100.

At step s100, the dirty data value stored in the level two cache 50 is passed to the level three memory 60 to be updated and the data value stored in the level two cache 50 is invalidated.

In the event that, at step s30, it is determined that the data transaction is associated with a write then processing proceeds to step s110.

At step s110, it is determined whether the data written by the level one cache 40 is marked as an eviction. If the write-back signal is not set then processing proceeds to step s120 where the outer cache attribute is read to determine the cache in policy.

If, at step s110, it is determined that the write-back signal is set then processing proceeds to step s120.

At step s120, it is determined whether a level two write-through is to occur. In the event that a level two write-through is not to occur the processing proceeds to step s130 where the data value is allocated to the level two cache 50. In the event that, at step s120 it is determined that level two write-through is to occur then, at step s140, the data is allocated to the level two cache 50 and also written to the level three memory 60.

The inner cache attribute is the signal SIDEBAND, the outer cache attribute is the signal ACACHE, the PROTECTION signal indicates whether the data is an instruction or is data, the WRITEBACK1 signal indicates whether the data is clean or dirty and the WRITEBACK0 signal indicates when an eviction occurs.

Hence, it will be appreciated that when a data transaction occurs by which a data value is requested to be allocated to the level one cache 40, the inner cache attributes are examined and if these indicate write-back cacheable then the level two cache 50 is accessed. If a hit occurs in the level two cache 50 then the data value is then passed to the level one cache 40 and the level two cache line which contained the data value is invalidated in order to remove that copy of the data value from the level two cache 50. When the access to the level two cache 50 results in a cache miss then the outer cache attributes are ignored and no allocation to the level two cache 50 is performed and the data is passed directly to the level one cache 40 without being allocated in the level two cache 50. Hence, once again the data value only appears in the level one cache 40.

When data is to be evicted from the level one cache 40, as indicated by the eviction signal, the level two controller 45 will allocate this data into the level two cache 50 unless the outer cache attributes indicate the data as non-cacheable. If the outer cache attribute is set to write-through read allocate then the data value is allocated to the level two cache 50 and is also written to the level three memory 60. If the outer cache attribute is write-back then data is allocated to the level two cache 50 and will automatically be marked as dirty unless the write-back signal is set to indicate that the cache line is clean. In both events, the eviction from the level one cache 40 results in the data value being marked as invalid in the level one cache 40. Accordingly, the data value only exists in the level two cache 50.

Also, for all write-through operations the data value is allocated to the level two cache 50 and also written to the level three memory 60. For all write-back operations, the data value is allocated to the level two cache 50. Only when the inner cache attributes are set to write-back does exclusive caching occur.

It will be appreciated that providing cache policy attributes with each data transaction enables a simple determination to be made of which cache should be used to store each data value, with other caches being prevented from storing that data value. This approach removes the need to perform any complex operations in order to determine which cache should be used to store that data value. Preventing a data value from being stored in both the level one cache 40 and the level two cache 50 at the same time ensures that the level one cache 40 and level two cache 50 do not store duplicate data and so increases the likelihood of a cache hit occurring.

Although illustrative embodiments of the invention have been described herein with reference to the accompanying drawings, it is to be understood that the invention is not limited to those precise embodiments, and that various changes and modifications can be affected therein by one scope in the art without departing from the scope and spirit of the invention as defined by the appended claims.

We claim:

1. A method of caching data values in a data processing apparatus, said data processing apparatus comprising a level one cache and a level two cache, both said level one cache and said level two cache being operable to store said data values, said method comprising the steps of:
   a) receiving a transaction request in which a data transaction relating to a data value is requested to occur, said transaction request including cache policy attributes associated with an address of said data value; and
   b) determining from said cache policy attributes whether or not said data value can be stored by at least one said level one cache and said level two cache and, if so, in which one of said level one cache and said level two cache said data value is to be stored in order to ensure that said data value is prevented from being stored in both said level one cache and said level two cache at the same time even if said cache policy attributes indicate that said data value can be stored in both said level one cache and said level two cache.

2. The method of claim 1, wherein said transaction request is a request to allocate said data value to said level one cache and said step (b) comprises:
   determining whether said cache policy attributes indicate that said data value is writeback cacheable to said level one cache and, if so, said method further comprises the step of requesting said data value from said level two cache and, if said request results in a level two cache hit, storing said data value to said level one cache and invalidating said data value stored in said level two cache.

3. The method of claim 1, wherein said transaction request is a request to allocate said data value to said level one cache and said step (b) comprises:
   determining whether said cache policy attributes indicate that said data value is writeaback cacheable to said level one cache and, if so, said method further comprises the step of requesting said data value from said level two cache and, if said request results in a cache miss, accessing said data value from a level three memory and storing said data value to said level one cache.

4. The method of claim 3, wherein said transaction request is a request to allocate said data value to said level one cache, said cache policy attributes indicate that said data value is writeaback cacheable to said level one cache, said step of requesting said data value from said level two cache results in a cache miss and said step accessing said data value from a level three memory and storing said data value to said level one cache comprises accessing said data value from said level three memory and storing said data value to said level one cache without storing said data value in said level two cache irrespective of whether said cache policy attributes indicate that said data value may be stored in said level two cache.

5. The method of claim 1, wherein said transaction request is a request to evict said data value from said level one cache and said step (b) comprises:
   determining whether said cache policy attributes indicate that said data value is cacheable to said level two cache and, if so, said method further comprises the step of evicting said data value stored in said level one cache and storing said evicted data value to said level two cache.

6. The method of claim 5, wherein said transaction request is a request to evict said data value from said level one cache, said cache policy attributes indicate that said data value is writethrough cacheable to said level two cache, said method further comprises the step of evicting said data value stored in said level one cache, storing said evicted data value to said level two cache and storing said evicted data value in said level three memory.

7. The method of claim 5, wherein said transaction request is a request to evict said data value from said level one cache, said cache policy attributes indicate that said data value is writeback cacheable to said level two cache, said method further comprises the step of evicting said data value stored in said level one cache, storing said evicted data value to said level two cache and marking said evicted data value in said level two cache as being dirty unless said cache policy attributes indicate said data value as being clean.

8. The method of claim 1, wherein said transaction request is a request to evict said data value from said level one cache and said step (b) comprises:
determining whether said cache policy attributes indicate that said data value is cacheable to said level two cache and, if not, said method further comprises the step of evicting said data value stored in said level one cache and storing said evicted data value to said level three memory.

9. The method of claim 1, wherein said cache policy attributes comprise an inner attribute indicative of a cache policy adopted by said level one cache for said address value and an outer attribute indicative of the cache policy adopted by said level two cache for said address value.

10. The method of claim 1, wherein said cache policy attributes are provided for transactions relating to data values other than those representing instructions.

11. The method of claim 1, further comprising the step of:
providing page tables associating each data value with predetermined cache policy attributes.

12. A data processing apparatus operable to cache data values, said data processing apparatus comprising a level one cache and a level two cache, both said level one cache and said level two cache being operable to store said data values, said data processing apparatus comprising:
reception logic operable to receive a transaction request requesting a data transaction of a data value occur, said transaction request including cache policy attributes associated with an address of said data value; and
determining logic operable to determine from said cache policy attributes whether or not said data value can be stored by at least one said level one cache and said level two cache and, if so, said determining logic being further operable to determine in which one of said level one cache and said level two cache said data value is to be stored in order to ensure that said data value is prevented from being stored in both said level one cache and said level two cache at the same time even if said cache policy attributes indicate that said data value can be stored in both said level one cache and said level two cache.

13. The data processing apparatus of claim 12, wherein said transaction request is a request to allocate said data value to said level one cache and said determining logic is operable to determine whether said cache policy attributes indicate that said data value is writeback cacheable to said level one cache and, if so, said determining logic being further operable to request said data value from said level two cache and, if said request results in a level two cache hit, to store said data value to said level one cache and invalidate said data value stored in said level two cache.

14. The data processing apparatus of claim 12, wherein said transaction request is a request to allocate said data value to said level one cache and said determining logic is operable to determine whether said cache policy attributes indicate that said data value is writeaback cacheable to said level one cache and, if so, said determining logic being further operable to request said data value from said level two cache and, if said request results in a cache miss, to access said data value from a level three memory and to store said data value to said level one cache.

15. The data processing apparatus of claim 14, wherein said transaction request is a request to allocate said data value to said level one cache, said cache policy attributes indicate that said data value is writeaback cacheable to said level one cache, said determining logic is operable to access said data value from said level three memory and to store said data value to said level one cache without storing said data value in said level two cache irrespective of whether said cache policy attributes indicate that said data value may be stored in said level two cache.

16. The data processing apparatus of claim 12, wherein said transaction request is a request to evict said data value from said level one cache and said determining logic is operable to determine whether said cache policy attributes indicate that said data value is cacheable to said level two cache and, if so, said determining logic is further operable to evict said data value stored in said level one cache and to store said evicted data value to said level two cache.

17. The data processing apparatus of claim 16, wherein said transaction request is a request to evict said data value from said level one cache, said cache policy attributes indicate that said data value is writethrough cacheable to said level two cache and said determining logic is further operable to evict said data value stored in said level one cache, to store said evicted data value to said level two cache and to store said evicted data value in said level three memory.

18. The data processing apparatus of claim 16, wherein said transaction request is a request to evict said data value from said level one cache, said cache policy attributes indicate that said data value is writeback cacheable to said level two cache and said determining logic is further operable to store said data value to said level two cache, to evict said data value stored in said level one cache and to mark said evicted data value in said level two cache as being dirty unless said cache policy attributes indicate said evicted data value as being clean.

19. The data processing apparatus of claim 12, wherein said transaction request is a request to evict said data value from said level one cache and said determining logic is operable to determine whether said cache policy attributes indicate that said data value is cacheable to said level two cache and, if not, said determining logic is further operable to evict said data value stored in said level one cache and to store said data value to said level three memory.

20. The data processing apparatus of claim 12, wherein said cache policy attributes comprise an inner attribute indicative of a cache policy adopted by said level one cache for said address value and an outer attribute indicative of the cache policy adopted by said level two cache for said address value.

21. The data processing apparatus of claim 11, wherein said cache policy attributes are provided for transactions relating to data values other than those representing instructions.

22. The data processing apparatus claim 11, further comprising:
 page tables associating each data value with predetermined cache policy attributes.

23. A data processing apparatus for caching data values, said data processing apparatus comprising a level one cache and a level two cache, said level one cache and said level two cache both for storing said data values, said data processing apparatus comprising:
 reception means for receiving a transaction request requesting a data transaction of a data value occur, said transaction request including cache policy attributes associated with an address of said data value; and
 determining means for determining from said cache policy attributes whether or not said data value can be stored by at least one said level one cache and said level two cache and, if so, for determining in which one of said level one cache and said level two cache said data value is to be stored in order to ensure that said data value is prevented from being stored in both said level one cache and said level two cache at the same time even if said cache policy attributes indicate that the said data value can be stored in both said level on cache and said level two cache.

* * * * *